Patented Nov. 7, 1944

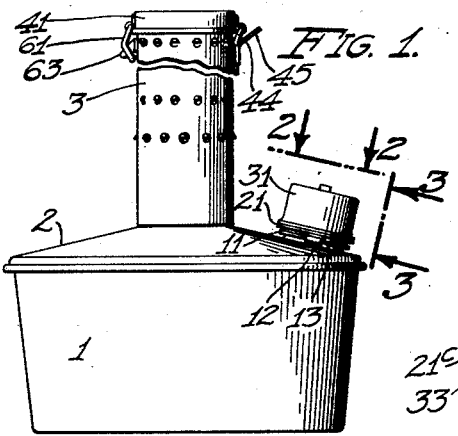

2,362,144

UNITED STATES PATENT OFFICE 2,362,144

DRAFT REGULATING MEANS FOR HEATERS

John Frederick Mahlstedt, Los Angeles, Calif.

Application March 20, 1940, Serial No. 325,021

9 Claims. (Cl. 158—91)

My present invention relates to draft regulating means, and is particularly adapted for orchard heaters known as distilling type heaters.

One of the principal objects of this invention is to provide draft regulating means of this class whereby a whole battery of orchard heaters may be lighted and regulated by one person, which ordinarily requires the services of two or more persons.

Another important object of this invention is to provide a draft regulating means of this class whereby a large or maximum amount of air is provided when the heater is lighted, and whereby the quantity of air is gradually diminished to a fixed minimum as the heater becomes fully lighted.

A further object of my invention is to provide a regulating means of this class whereby the supply of air, which sustains combustion, may be quickly and fully shut off to extinguish combustion in the heater.

A still further important object of this invention is to provide a means of this class for orchard heaters which is so fastened that it may be easily and quickly shifted from its normal draft regulating position so as to expose a filling opening for replenishing the heater with a fuel supply, thereby eliminating the necessity of an additional filling opening in the heater or the cover therefor.

An object also of this invention is to provide draft regulating means of this class which is particularly simple, economical and durable of construction, which may be used with and readily attached to heaters now in use, and which will not readily deteriorate or get out of order.

With these and other objects in view as will appear hereinafter, I have devised a draft regulating means for heaters, for carrying out the foregoing objects, as will be hereinafter described in detail and particularly set forth in the appended claims, reference being had to the accompanying drawing and to the characters of reference thereon, which form a part of this application, in which:

Fig. 1 is a fragmentary elevation of an orchard heater, showing my draft regulator incorporated therein;

Fig. 2 is an enlarged fragmentary plan view of my regulator taken at 2—2 of Fig. 1;

Fig. 3 is an enlarged fragmentary front elevation thereof, taken at 3—3 of Fig. 1, showing only the cover partly broken away and in section;

Fig. 4 is a sectional elevation thereof, taken through 4—4 of Fig. 2, but showing the regulator in its normal inclined position on the cover of a conventional orchard heater;

Fig. 5 is a sectional view taken through 5—5 of Fig. 3, but showing the cover in its open position for admitting air;

Fig. 6 is a perspective view of the stop cam for the thermostatic element; and,

Fig. 7 is an elevational view taken from the position indicated by 3—3 of Fig. 1, but on a reduced scale from that shown in Fig. 3, showing the regulator swung back to expose the filling opening.

The draft regulator or regulating means of my invention is shown on or in connection with a conventional orchard heater. The heater shown consists essentially of a fuel receptacle 1, a cover 2 for covering substantially the whole of the upper part of the receptacle, and a stack 3 rising above the central portion of the cover.

The cover in the conventional orchard heater, as shown in the drawing, is provided with a draft and filling opening 2$^a$ in an annular flange or neck 2$^b$.

My regulator, as illustrated, is carried on an annular frame 11 which is adapted to receive the neck 2$^b$ and thereby locate the regulator on the cover 2. The frame 11 is flared at its lower edge, as indicated by 11$^a$ to facilitate the location or seating of the regulator around the neck 2$^b$. This frame is hinged at one side to the cover 2, the hinge consisting of a clip 12, and a link 13 pivotally connecting the frame to the clip. At the opposite side of the frame is a handle 14, which is secured to the hood or cover 31, as will be more fully described hereafter. This handle 14 is adapted to engage a clasp or spring clip 15, also secured to the cover 2.

On the frame 11 is carried an inverted cup or dome-shaped housing 21, the lower portion of which extends around the frame, and may be spot-welded thereto. The lower edge of the housing is also outwardly flared, as indicated by 21$^a$. At the front side of the housing, when viewed from the regulator side of the heater, is an opening 21$^b$, the lower edge of which is positioned only slightly above the frame.

Within the housing is a segmental draft door 22 which is hinged at its rear edge to near the rear and upper portion of the frame 11. The front portion of the draft door is adapted to close downwardly and seat, when in its extreme lower position, on a circular seat 11$^b$ extending around the upper edge of the frame.

At the underside of the draft door is a thermostatic element 23, which consists of strips of metal of different coefficients of expansion. One end of this element or strip is supported by the bracket 24 which is secured to the underside of the draft door adjacent its hinged mounting. The thermostatic element extends substantially parallel to the axis of the hinge and engages, at its free end, a stop-cam 25 secured to the underside of the frame 11 at the side of the hinge axis opposite the draft door. Normally the free end of the thermostatic element rests against the stop cam and holds the draft door in an open position. As the element is distorted by heat, the door is allowed to close by gravity against the seat 11b of the frame. The stop-cam 25 is so constructed, as shown best in Fig. 6, that the free end may be bent downwardly or outwardly for regulating the closing of the draft door at various temperatures.

In the free portion of the draft door is provided a vent, which is shown as a plurality of ports 22a and 22b, for admitting the required amount of air into the firebox, heated chamber, or fuel receptacle, when the draft door is closed against its seat. On the draft door is pivoted a sliding gate 26 which may be drawn over the ports 22a and 22b for regulating the amount of draft to pass therethrough from the atmosphere to the fuel receptacle. The gate has a lug 26a to facilitate the shifting thereof, and the door has a lug 22c to limit the closed position of such gate.

These ports 22a and 22b form in substance a circumferential opening about the pivotal center of the gate, the opening being wide near the closed position and narrow at the wide-open position. A large amount of air is required for normal combustion. Additional air is provided in accurately regulated quantities. For these reasons the width of the opening is uniformly decreased near the wide-open end of the air inlet, and uniform opening adjustment of the gate will admit an added but uniformly decreasing amount of air.

Over the housing 21 is provided a dome-shaped cover or hood 31, which is adapted to enclose the housing and the opening 21b thereof. The hood also has an opening 31a which registers with the opening 21a when the hood is rotated to its open poistion. The hood is adapted to rest upon the outwardly flared flange 21a and is axially pivoted on the housing by a bolt 32 which extends through the upper portions of the hood and housing. In this manner the hood is held against said flared flange 21a. The handle 14, referred to above, is secured to this hood or cover to facilitate the rotation thereof with respect to the housing, and since the hood encloses and is secured to the whole regulator, it holds the frame 11 in position against the cover 2 around the neck 2b, and further facilitates the raising of the regulator about its hinge to expose the opening 2a, as shown in Fig. 7.

In order to limit the rotation of the hood in a clockwise direction, that is, to a position in which the openings 21b and 31a are in registry, there is provided a stop 33, which may engage a shoulder 21c on the housing 21.

To prevent moisture, rain, dew, and the like, from entering the fuel receptacle, there may be provided a trough 21d at the upper portion of the housing. The ends of the trough are shown as directed downwardly to the sides of the housing, as indicated by 21e, to discharge the moisture to the outer sides of the frame and the neck.

In order to extinguish the flame in the receptacle of the burner, the cover is rotated to the solid line position shown in Figure 2, followed by the capping of the stack, by closing the cap or lid 41 over the top of the stack 3. In order to fill the receptacle with fuel, the cover is rotated only slightly in a clockwise direction, and lifted from the neck about the hinge, exposing the filling opening 2a.

Though I have shown and described a particular construction of my regulator, and particular application thereof, I do not wish to be limited to the same, but desire to include in the scope of my invention, the construction, combination, and arrangement substantially as set forth in the appended claims.

I claim:

1. In a draft regulator, the combination with a heater provided with a heated chamber having a draft opening, of a weather housing removably mounted over the draft opening and having a frame secured to its lower portion, said frame being located over the opening, said housing being removable, with the frame, from the opening, a draft door mounted on the frame and within the housing and movable with respect to the opening, and a thermostatic element in association with the frame and the door for normally holding the door in an open position over the opening, said element being arranged in heat exchanging relation with said chamber, said door being mounted gradually to close over the opening when the element is heated.

2. In a draft regulator, the combination with a heater provided with a heated chamber having a draft opening, of a weather housing removably mounted over the draft opening and provided at its lower portion with a frame located over the opening, said housing being removable, with the frame, from the opening, a draft door mounted on the frame and within the housing and movable with respect to the opening, a thermostatic element in association with the housing and the door for normally holding the door in an open position over the opening, said element being arranged in heat exchanging relation with said chamber, said door being mounted gradually to close over the opening when the element is heated, said housing having a vent opening and a hood for the housing, said hood having means for manually manipulating the hood for closing the vent opening in the housing.

3. In a draft regulator, the combination with a heater provided with a heated chamber having a draft opening, of an annular supporting frame positioned over and around the draft opening of the heater and also provided with a draft opening registering with the former opening, a draft door movably mounted on the frame in such a manner as to close over the opening in the frame, a thermostatic element, in association with the door, normally adapted to hold the door open above the frame opening, and, when heated, to allow the door to close over the latter opening, a hood secured to but rotatably mounted on the frame to enclose the annular supporting frame and the draft door, said hood having means for manually rotating the hood for enclosing the frame and thereby closing said draft opening therein.

4. In a draft regulator, the combination with a heater having a draft opening, of an inverted cylindrical cup-shaped weather housing pivoted at one side so as to close over the opening when in one position and to uncover the opening when in another position, the cylindrical wall of the housing being open at one side and provided at the interior of its bottom portion with a seat, a draft door pivotally mounted at one edge within the housing and at the side thereof opposite the opening in the housing, and a thermostatic element at the underside of and at the pivotal mounting of the door, said element being normally adapted to hold the door in an open position above the seat, said element, when heated allowing the door to close against the seat.

5. In a draft regulator, the combination with a heater having a draft opening, of an inverted cylindrical cup-shaped weather housing pivoted at one side so as to close over the opening when in one position and to uncover the opening when in another position, the cylindrical wall of the housing being open at one side and provided at the interior of its bottom portion with a seat, a draft door pivotally mounted at one edge within the housing and at the side thereof opposite the opening in the housing, a thermostatic element at the underside of and at the pivotal mounting of the door, said element being normally adapted to hold the door in an open position above the seat, said element, when heated, allowing the door to close against the seat, said door having aid-admitting openings, and means at the free portion of the door for adjusting the side of the housing.

6. In a draft regulator, the combination with a heater having a draft opening, of an inverted cylindrical cup-shaped housing pivoted at its one side on the heater so as to close over the opening when in one position and to uncover the opening when in another position, the cylindrical wall of the housing being open at one side and provided at the interior of its bottom portion with a seat, a draft door pivotally mounted at one edge within the housing and at the side thereof opposite the opening in the housing, a thermostatic element at the underside of and at the pivotal mounting of the door, said element being normally adapted to hold the door in an open position above the seat, said element, when heated, allowing the door to close against the seat, said door having aid-admitting openings, means at the free portion of the door for adjusting the aid-admitting openings through the open side of the housing, an inverted cylindrical cup-shaped hood positioned around the housing and axially pivoted to the upper portion thereof, said cover having an opening in the cylindrical wall at one side for registering with the opening in the housing when the former is in one position and for closing the opening in the housing when the hood is shifted to its substantially diametrically opposite position, a handle on the hood to facilitate rotation of the latter with respect to the housing, and a keeper on the heater for receiving the handle to hold the housing closed over the heater draft opening.

7. In a draft regulator, the combination with a heater having a draft opening, of an inverted cylindrical cup-shaped housing removably hinged at one side on the heater and located adjacent the opening, said housing having an opening at one side, a draft door within the housing, means normally holding the door open to provide a passage for air through the opening of the housing and said draft opening of the heater, said door closing said draft opening when said means is heated, and an inverted cylindrical cup-shaped cover axially pivoted around the housing and provided with a laterally extended latch arm to facilitate its rotation about its axis relative to the housing, the heater having a latch adjacent the draft opening for receiving the arm and holding the housing over the draft opening, said cover also having a draft opening in its cylindrical wall adapted to register with the opening of the housing when the cover is rotated to its open position, said housing and cover, when unlatched, being capable of being raised about the hinge for filling the heater with fuel through the draft opening thereof.

8. In a draft regulator, the combination with a heater provided with a heated chamber having a draft opening, of an inverted cup-shaped weather housing removably mounted over the draft opening and provided at its lower portion with a frame located immediately over the opening, said frame also having a draft opening registering with the heater opening, a draft door movably mounted on the frame in such a manner as to close over the opening therein, a thermostatic element adapted normally to hold the door open above the frame, and, when heated, to allow the door to close over the latter opening, and a dome-shaped hood rotatably mounted around the housing to enclose the same and the draft door, the housing and hood having normally registering openings when the hood is open, said hood having means for manually rotating the hood for closing said normally registering openings in the housing and the hood.

9. In a draft regulator, the combination with a heater having a draft opening, of an inverted cylindrical cup-shaped housing mounted to close over and to uncover the opening, the cylindrical wall of the housing being open at one side and provided at the interior of its bottom portion with a seat, a draft door movably mounted within the housing, a thermostatic element at the underside of the door, said element being normally adapted to hold the door in an open position above the seat, said element, when heated, allowing the door to close against the seat, an inverted cylindrical cup-shaped hood positioned around the housing and axially pivoted to the upper portion thereof, said hood having an opening in the cylindrical wall at one side for registering with the opening in the housing when the former is in one position and for closing the opening in the housing when the hood is shifted to its substantially diametrically opposite position, a handle on the hood to facilitate rotation of the latter with respect to the housing, and a keeper on the heater for receiving the handle to hold the housing closed over the heater draft opening.

JOHN FREDERICK MAHLSTEDT.